US011866606B2

(12) United States Patent
Grubbs, III et al.

(10) Patent No.: US 11,866,606 B2
(45) Date of Patent: Jan. 9, 2024

(54) BIODEGRADABLE COATINGS BASED ON AQUEOUS PHA DISPERSIONS

(71) Applicant: Danimer IPCo, LLC, Bainbridge, GA (US)

(72) Inventors: Joe B. Grubbs, III, Bishop, GA (US); Richard Eaton, Athens, GA (US); Karson Durie, Athens, GA (US)

(73) Assignee: Danimer IPCo, LLC, Bainbridge, GA (US)

( * ) Notice: Subject to any disclaimer, the term of this patent is extended or adjusted under 35 U.S.C. 154(b) by 60 days.

(21) Appl. No.: 16/537,800

(22) Filed: Aug. 12, 2019

(65) Prior Publication Data
US 2020/0048493 A1 Feb. 13, 2020

Related U.S. Application Data

(60) Provisional application No. 62/718,039, filed on Aug. 13, 2018.

(51) Int. Cl.
| | | |
|---|---|---|
| *C09D 167/04* | (2006.01) | |
| *C09D 7/65* | (2018.01) | |
| *C09D 7/61* | (2018.01) | |
| *C09D 7/45* | (2018.01) | |
| *C09D 7/63* | (2018.01) | |
| *B65D 65/42* | (2006.01) | |
| *B65D 65/46* | (2006.01) | |
| *C09D 5/14* | (2006.01) | |

(52) U.S. Cl.
CPC ........... *C09D 167/04* (2013.01); *B65D 65/42* (2013.01); *B65D 65/466* (2013.01); *C09D 5/14* (2013.01); *C09D 7/45* (2018.01); *C09D 7/61* (2018.01); *C09D 7/63* (2018.01); *C09D 7/65* (2018.01)

(58) Field of Classification Search
None
See application file for complete search history.

(56) References Cited

U.S. PATENT DOCUMENTS

| | | | |
|---|---|---|---|
| 5,362,573 A † | 11/1994 | Pandian | |
| 6,169,130 B1 † | 1/2001 | Bodmeier | |
| 6,440,207 B1 | 8/2002 | Schulz | |
| 7,491,754 B2 † | 2/2009 | Senda | |
| 8,153,697 B2 † | 4/2012 | Frank | |
| 8,822,584 B2 † | 9/2014 | Whitehouse | |
| 2003/0113564 A1* | 6/2003 | Noda | B32B 27/06 428/480 |
| 2003/0217648 A1† | 11/2003 | Noda | |
| 2005/0058712 A1 | 3/2005 | Serpelloni et al. | |
| 2006/0258833 A1* | 11/2006 | Senda | C09D 167/04 528/272 |
| 2007/0088099 A1 | 4/2007 | Mentink et al. | |
| 2015/0252186 A1* | 9/2015 | Suzuki | C08L 23/0853 524/387 |
| 2016/0009914 A1* | 1/2016 | Sobotka | C08L 29/04 524/501 |
| 2017/0247537 A1* | 8/2017 | Hipps, Sr. | C08J 3/05 |
| 2018/0105639 A1* | 4/2018 | Arnold | C08G 63/88 |
| 2018/0171559 A1† | 6/2018 | Hipps, Sr. | |

FOREIGN PATENT DOCUMENTS

| | | |
|---|---|---|
| EP | 1566409 A1 | 8/2005 |
| JP | 2001146523 A | 5/2001 |
| JP | 2002121288 A | 4/2002 |
| JP | 2005350530 A | 12/2005 |
| JP | 2006136657 A | 6/2006 |
| WO | 9600263 A1 | 1/1996 |
| WO | 199600263 † | 1/1996 |
| WO | 0194697 A2 | 12/2001 |
| WO | 2010151798 A2 | 12/2010 |
| WO | 2014023319 † | 2/2014 |
| WO | 2014023319 A1 | 2/2014 |
| WO | 2017087658 A1 | 5/2017 |
| WO | 2018186278 † | 10/2018 |

OTHER PUBLICATIONS

Datasheet for TEGO Antifoam 2-89 (Year: 2017).*
Datasheet for Tween 20 polyoxyethylene sorbitan monolaurate (Year: 2021).*
International Search Report and Written Opinion for PCT/US2019/046102, dated Nov. 25, 2019, 13 pages.
CAMLAB PolyvinylAlcoholDisperingAgent—2023.
Chemate Technology Co Ltd Sodium Hexametaphosphate Uses 2023.
ENASPOL Syntapn OD.
John Bielman Wiley VCH Additives for Coating the Netherlands Jan. 2000.
Natasha Giilani Commercial Uses of Sodium Polyacrylate Apr. 25, 2017.
Special Chem Additives for High Performance Low Voc Water Based Coatings.
Wodsaeter et al Soft Matter Feb. 14, 2015.
Sigma-Aldrich, Surfactants Classified by HLB Numbers Accessed Aug. 11, 2020 https://www.sigmaaldrich.com/materials-science/material-science-products.html?TablePage=22686648#:~:text=It%20is%20a%20value%20between,affinity%20of%20oil%20 (lipophilic). pp. 1-3.†

\* cited by examiner
† cited by third party

*Primary Examiner* — Robert T Butcher
(74) *Attorney, Agent, or Firm* — Luedeka Neely, P.C.

(57) ABSTRACT

A biodegradable aqueous dispersion is disclosed, which is made up of from about 35 to about 75 weight percent water and from about 25 to about 65 weight percent of polyhydroxyalkanoates. Also disclosed is a biodegradable food service item, which includes a biodegradable substrate having at least one food contact surface. A coating is applied over the at least one food contact surface, which is formed from the biodegradable aqueous dispersion.

19 Claims, No Drawings

BIODEGRADABLE COATINGS BASED ON AQUEOUS PHA DISPERSIONS

FIELD

This disclosure relates to biodegradable polymeric compositions. More particularly, this disclosure relates to biodegradable coatings for food service items made from aqueous dispersion of polyhydroxyalkanoates ("PHAs").

BACKGROUND

For the sake of convenience, consumers frequently use food service items—such as plates, bowls, cups, and eating or drinking utensils—which are disposable. Disposable food service items are particularly convenient for serving food at large gatherings of people and at outdoor dining events.

Disposable food service items may readily be advantageously fabricated from substrates such as paperboard which decompose relatively quickly after landfill disposal. However, a simple, uncoated paperboard substrate generally performs poorly as a food service item because the paperboard will rapidly soak up water and/or grease which compromises the strength of the paperboard. Consequently, food service items made from paperboard are typically coated with thin polymer layer to provide improved water and grease resistance.

Coating made from polymers such as polyethylene (PE), polypropylene (PP), or polyethylene terephthalate (PET) may significantly improve the resistance of the paperboard to water and/or grease absorption; however, such polymers do not readily degrade or decompose after landfill disposal. Thus, the paperboard items coated with such polymers may subsist in landfills for centuries after disposal.

Thus, it would be desirable to provide a new coating for food service items which is fully biodegradable. Moreover, it would also be desirable if this biodegradable coating provided good water and grease resistance—i.e. water and grease resistance comparable to that provided by conventional, nonbiodegradable coatings.

SUMMARY OF THE INVENTION

The above and other needs are met by a biodegradable aqueous dispersion for coating food contact substrates. According to one embodiment, this dispersion is made up of from about 35 to about 75 weight percent water and from about 25 to about 65 weight percent of polyhydroxyalkanoates.

In certain embodiments, the dispersion is preferably made up of from about 25 to about 65 weight percent poly-3-hydroxybutyrate-co-3-hydroxyhexanoate ("P(3HB-co-3HHx)"). Moreover, in certain embodiments, this P(3HB-co-3HHx) is in turn preferably made up of from about 75 to about 99 mole percent hydroxybutyrate and from about 1 to about 25 mole percent hydroxyhexanoate. More preferably, the P(3HB-co-3HHx) is made up of from about 85 to about 95 mole percent hydroxybutyrate and from about 5 to about 15 mole percent hydroxyhexanoate.

In some embodiments, the dispersion is preferably made up of from about 1 to about 25 weight percent of at least one polyhydroxyalkanoate comprising from about 25 to about 50 mole percent of hydroxyvalerate, hydroxyhexanoate, hydroxyoctanoate, and/or hydroxydecanoate.

Further, in some instances, the polyhydroxyalkanoate polymer may be a terpolymer, made up of at least three different type of hydroxyalkanoate monomer residues. The terpolymer may, for example, include from about 75 to about 99 mole percent of hydroxybutyrate, from about 0.1 to about 15 mole percent of hydroxyvalerate, and from about 1 to about 25 mole percent of a third hydroxyalkanoate, such as hydroxyhexanoate According to certain embodiments, the polyhydroxyalkanoates in the dispersion preferably have a weight average molecular weight from about 50,000 Daltons to about 2.5 million Daltons. More preferably, the weight average molecular weight is from about 150,000 Daltons to about 600,000 Daltons, and still more preferably from about 150,000 Daltons to about 500,000 Daltons.

In certain embodiments, the dispersion is made up of particles preferably having an average particle size from about 10 nm to about 50 Further, in some embodiments, the dispersion preferably has an average solids content from about 25 percent to about 65 percent solids. More preferably, the average solids content is from about 40 percent to about 55 percent solids and even more preferably from about 40 to about 50 percent solids.

In addition to the water and the PHA, the dispersion may, optionally, include further components. For instance, in certain embodiments, the dispersion preferably also includes from about 0.01 weight percent to about 5.0 weight percent of at least one surfactant selected from the group consisting of polysorbates, aromatic polyethylene oxides, sorbitan derivatives, block copolymers of poly(ethylene oxide) and poly(propylene oxide), poly(glycol ethers), poly(vinyl alcohol), alkyl sulfates, alkyl phosphates, stearates, and mixtures thereof. More preferably, the dispersion includes from about 0.5 weight percent to about 5.0 weight percent of the at least one surfactant, and even more preferably from about 0.5 weight percent to about 2.0 weight percent of the at least one surfactant.

In some instances, this at least one surfactant preferably has a hydrophilic-lipophilic balance which is greater than 10. More preferably, the at least one surfactant preferably has a hydrophilic-lipophilic balance which is from about 12 to about 15.

In some embodiments, the dispersion preferably also includes from about 0.01 weight percent to about 5.0 weight percent of at least one rheology modifier selected from the group consisting of polysaccharides, acrylate-based emulsion copolymers, viscosity depressants, and viscosity enhancers.

In some instances, the dispersion preferably also includes from about 0.01 weight percent to about 2.5 weight percent of at least one wetting and dispersing agent.

According to certain embodiments, the dispersion preferably also includes from about 0.01 weight percent to about 0.5 weight percent of at least one biocide or biostatic agent.

In certain embodiments, the dispersion preferably also includes from about 0.1 weight percent to about 5.0 weight percent of at least one coalescing agent selected from the group consisting of bio-succinic acid based coalescing solvent, 2,2,4-trimethyl-1,3-pentanediol monoisobutyrate, dimethyl carbonate, methanol, ethanol, ketones, acetates, and or mixtures thereof.

In some embodiments, the dispersion preferably also includes from about 1 weight percent to about 35 weight percent of at least one filler selected from the group consisting of clays, calcium carbonate, talc, kaolinite, montmorillonite, bentonite, silica, chitin, titanium dioxide, nano clay, mica, or mixtures thereof.

In certain embodiments, the dispersion preferably also includes from about 0.5 weight percent to about 15 weight percent of at least one plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long chain alkyl acids, adipates, glycerol, isosorbide derivatives or mixtures thereof.

In other embodiments, the dispersion preferably also includes from about 0.1 weight percent to about 5 weight percent of at least one nucleating agent selected from the group consisting of sulfur, erythritols, pentaerythritol, dipentaerythritols, artificial sweeteners, stearates, sorbitols, mannitols, polyester waxes, compounds having a 2:1;2:1 crystal structure chemicals, and mixtures thereof.

According to some embodiments, the dispersion preferably also includes from about 0.01 weight percent to about 5 weight percent of at least one crosslinking agent selected from the group consisting of calendula oil, stabilized ammonium zirconium carbonate, anionic hydroxylated zirconium polymers, potassium zirconium carbonate, anionic hydroxylated zirconium polymers, zinc tetraamine carbonate, and mixtures thereof.

In some embodiments, the dispersion preferably also includes from about 0.05 to about 1 weight percent of at least one defoamer selected from the group consisting of polyether siloxanes, polyamide particles, and mixtures thereof.

In one preferred embodiment, the dispersion may, in addition to the water and the PHA also include: (1) from about 0.01 weight percent to about 5.0 weight percent of at least one surfactant; (2) from about 0.01 weight percent to about 5.0 weight percent of at least one rheology modifier; (3) from about 0.01 weight percent to about 2.5 weight percent of at least one wetting and dispersing agent; and (4) from about 0.01 weight percent to about 0.5 weight percent of at least one biocide or biostatic agent.

In a second aspect, the present disclosure provides a biodegradable food service item. According to one embodiment, the biodegradable food service item includes a biodegradable substrate having at least one food contact surface. The food service item also includes a coating applied over the at least one food contact surface. This coating is applied as a biodegradable aqueous dispersion, which is made up of from about 35 to about 75 weight percent water and from about 25 to about 65 weight percent of polyhydroxyalkanoates.

In certain embodiments, the biodegradable substrate is preferably a biodegradable plate, cup, bowl, fiber tray, or eating utensil.

In some embodiments, the coating is preferably applied over the at least one food contact surface at a coating weight, on a dry basis, from about 2 to about 25 grams per square meter, and more preferably from about 4 to about 25 grams per square meter.

In certain embodiments, the coating preferably exhibits a Cobb water absorption value, measured according to TAPPI Standard T441, of less than 20 grams per square meter. More preferably, the Cobb water absorption value is less than 10 grams per square meter. Further, in certain embodiments, the coating preferably exhibits a Kit Test grease resistance value, measured according to TAPPI Standard T559 cm-12, of greater than Kit Value 5. More preferably, the Kit Value is from about 8 to about 12.

DETAILED DESCRIPTION

Biodegradable Aqueous Dispersion

According to the present disclosure a biodegradable aqueous dispersion for coating food contact and other substrates is provided. This dispersion includes at least water and polyhydroxyalkanoates, and may also include other components, as discussed in more detail below.

As used herein, the term "biodegradable" refers to a plastic or polymeric material coating that will undergo biodegradation by living organisms (microbes) in anaerobic and aerobic environments (as determined by ASTM D5511), in soil environments (as determined by ASTM 5988), in freshwater environments (as determined by ASTM D5271 (EN 29408)), or in marine environments (as determined by ASTM D6691). The biodegradability of biodegradable plastics can also be determined using ASTM D6868 and European EN 13432.

The aqueous dispersion of the present disclosure is preferably also "compostable", as determined by ASTM D6400 for industrial or home compostability.

Water is the solvent for the dispersion and will typically make up from about 35 weight percent to about 75 weight percent of the dispersion. More preferably, the water makes up from about 40 weight percent to about 60 weight percent of the dispersion.

The dispersion also includes polyhydroxyalkanoates ("PHAs"). The polyhydroxyalkanoates will typically make up from about 25 to about 65 weight percent the dispersion. More preferably, the polyhydroxyalkanoates will make up from about 40 to about 55 weight percent the dispersion.

A preferred polyhydroxyalkanoate for use in the dispersion is poly-3-hydroxybutyrate-co-3-hydroxyhexanoate ("P(3HB-co-3HHx)"). In certain embodiments, P3HB-co-P3HHx is the primary polyhydroxyalkanoate in the dispersion. In some instances, the P(3HB-co-3HHx) may be substantially the only polyhydroxyalkanoate used in the dispersion. Thus, in certain embodiments of the present disclosure, the dispersion may be preferably made up of from about 25 to about 65 weight percent P(3HB-co-3HHx).

The aforementioned P(3HB-co-3HHx) is in turn a copolymer made up of both hydroxybutyrate and hydroxyhexanoate and the relative amounts of the two may vary somewhat. In general, however, it is preferred that the P(3HB-co-3HHx) be made up of from about 75 to about 99 mole percent hydroxybutyrate and from about 1 to about 25 mole percent hydroxyhexanoate. More preferably, the P(3HB-co-3HHx) is made up of from about 85 to about 95 mole percent hydroxybutyrate and from about 5 to about 15 mole percent hydroxyhexanoate.

In some embodiments, the dispersion is preferably made up of from about 1 to about 25 weight percent of at least one polyhydroxyalkanoate comprising from about 25 to about 50 mole percent of hydroxyvalerate, hydroxyhexanoate, hydroxyoctanoate, and/or hydroxydecanoate.

The molecular weight range of the polyhydroxyalkanoates used in the dispersion may also vary somewhat. Typically, the polyhydroxyalkanoates in the dispersion may have a weight average molecular weight from about 50,000 Daltons to about 2.5 million Daltons. More preferably, the weight average molecular weight for the polyhydroxyalkanoates is from about 150,000 Daltons to about 600,000 Daltons, and still more preferably from about 150,000 Daltons to about 500,000 Daltons.

In certain embodiments, the dispersion is made up of particles preferably having an average particle size from about 10 nm to about 50 μm. Further, in some embodiments, the dispersion preferably has an average solids content from about 25 percent to about 65 percent solids. More preferably, the average solids content is from about 40 percent to about 55 percent solids and even more preferably from about 40 to about 50 percent solids.

In addition to the water and the PHA, the dispersion may, optionally, include further components as well. For instance, the dispersion may also include a surfactant, a rheology modifier, a wetting and dispersing agent, a biocide or biostatic agent, a coalescing agent, a filler, a plasticizer, a nucleating agent, and/or a cross-linking agent.

As used herein, "surfactants" are added to dispersions to stabilize the polymer in the aqueous medium. Surfactants typically consist of both hydrophobic and hydrophilic regions. In a dispersion, these distinct regions orient themselves at the interface of the polymer particles and aqueous medium, lowering the surface energy between the boundaries of the two phases to promote dispersion.

As used herein, a "rheology modifier" is a substance that changes the flow characteristics of the dispersion (i.e. thinning or thickening the dispersion).

As used herein, "wetting and dispersing agents" are types of surfactants that contribute to stabilization of the polymer and homogeneity of the dispersion. These materials typically contain bulky groups that keep the suspended particles separated through steric hindrance, which help prevent flocculation and settling of the particles. Wetting and dispersing agents also ensure the particles are fully wet by the aqueous medium, promoting full, homogeneous dispersion.

As used herein, a "biocide" is a material that kills organisms and thus protects the materials from microorganism growth and adhesion. A "biostatic agent" is a material which prevents microorganisms such as bacteria or fungi from growing, but without killing the microorganisms.

As used herein, "coalescing agents" are materials, usually organic solvents, that temporarily plasticize a material in a dispersion to aid in faster drying times. Coalescing agents typically have a higher boiling point than water, so upon drying, the water will evaporate first, leaving behind the coalescing agent to continue to plasticize the polymer until it evaporates as the drying process continues.

As used herein, "fillers" such as clay, silica, and other inorganic materials provide multiple functions in dispersions. First, these materials increase the solid content of the dispersion. Second, fillers may alter the brightness and gloss of the formed film. Finally, fillers may additionally serve as thickeners.

As used herein, "plasticizers" are materials which act to disrupt interactions between polymer chains, allowing the polymer chains to become more flexible. The introduction of a plasticizer significantly lowers the glass transition temperature ($T_g$) of the polymer.

As used herein, "nucleating agents" are materials which act to promote the crystallization of polymers in the dispersion after drying. Nucleating agents give sites where crystals can form, shortening the crystallization time for the film. The faster the crystals develop, the shorter the wait time before the coating is ready for use.

As used herein, "cross-linking agents" are materials that form robust, chemical bonds between a polymeric coating and a substrate as well as within the polymeric coating itself. Cross-linking creates a stronger, harder film coating that will be more resistant to abrasion and wear.

As used herein, "defoamers" are materials that reduce or eliminate foam in the dispersion. Foam in dispersions often results in films with imperfections or defects during application that affect the barrier properties of the coating.

For instance, in certain embodiments, the dispersion preferably also includes from about 0.01 weight percent to about 5.0 weight percent of at least one surfactant selected from the group consisting of polysorbates (such as TWEEN), aromatic polyethylene oxides (such as TRITON), sorbitan derivatives (such as SPAN), block copolymers of poly (ethylene oxide) and poly(propylene oxide) (such as PLURONIC)), poly(glycol ethers) (such as TERGITOL), poly(vinyl alcohol), alkyl sulfates, alkyl phosphates, stearates, and mixtures thereof. More preferably, the dispersion includes from about 0.5 weight percent to about 2.0 weight percent of the at least one surfactant.

In some instances, this at least one surfactant preferably has a hydrophilic-lipophilic balance which is greater than 10. More preferably, the at least one surfactant preferably has a hydrophilic-lipophilic balance which is from about 12 to about 15.

Also, in some embodiments, the dispersion preferably may also include from about 0.01 weight percent to about 5.0 weight percent of at least one rheology modifier selected from the group consisting of polysaccharides (such as starches, xanthum gum, guar gum, cellulose fibers, and seaweed extracts), acrylate-based emulsion copolymers, viscosity depressants (such as VISCOBYK 5120 or blends containing carboxylic acid esters and wetting and dispersing components), and viscosity enhancers (such solutions of modified polyurethanes including the BYK 400 family or derivatives of copolymers of ethyl acrylate and methacrylic acid such as ALCOGUM).

In some instances, the dispersion may include from about 0.01 weight percent to about 2.5 weight percent of at least one wetting and dispersing agent (such as BYK 190, BYK 184, TEGO 755, or TEGO 761 but not limited to which are believed to be non-ionic or slightly anionic copolymers).

According to certain embodiments, the dispersion may also include from about 0.01 weight percent to about 0.5 weight percent of at least one biocide or biostatic agent (such as ethylenediaminetetraacetic acid (EDTA) or benzisothiazolinone).

Moreover, the dispersion may also include from about 0.1 weight percent to about 5.0 weight percent of at least one coalescing agent selected from the group consisting of bio-succinic acid based coalescing solvent (such as MYRIFILM), 2,2,4-trimethyl-1,3-pentanediol monoisobutyrate (such as Eastman TEXANOL), benzoate esters or alkyl benzoate esters (such as Eastman BENZOFLEX or VELATE), dimethyl carbonate, methanol, ethanol, ketones, acetates, and or mixtures thereof.

In some embodiments, the dispersion preferably may include from about 1 weight percent to about 35 weight percent of at least one filler selected from the group consisting of clays, calcium carbonate, talc, kaolinite, montmorillonite, bentonite, silica, chitin, titanium dioxide, nano clay, or mixtures thereof.

In certain embodiments, the dispersion may also include from about 0.5 weight percent to about 15 weight percent of at least one plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, polyethylene glycols having a number average molecular weight of 400-10,000 g/mol, esters of vegetable oils, long chain alkyl acids, adipates, glycerol, isosorbide derivatives or mixtures thereof.

In other embodiments, the dispersion preferably also includes from about 0.1 weight percent to about 5 weight percent of at least one nucleating agent selected from the group consisting of sulfur, erythritols, pentaerythritol, dipentaerythritols, artificial sweeteners, stearates, sorbitols, mannitols, polyester waxes, compounds having a 2:1;2:1 crystal structure chemicals, and mixtures thereof.

According to some embodiments, the dispersion preferably also includes from about 0.01 weight percent to about 5 weight percent of at least one crosslinking agent selected from the group consisting of calendula oil, stabilized ammonium zirconium carbonate, anionic hydroxylated zirconium polymers (such as BACOTE), potassium zirconium carbonate, anionic hydroxylated zirconium polymers (such as ZIRMEL and ZIRMEL XL), zinc tetraamine carbonate (such as ZINPLEX), and mixtures thereof.

In other embodiments, the dispersion includes from about 0.05 to about 1 weight percent of at least one silicone and/or mineral oil free defoamer selected from the group consisting of polyether siloxanes (such as AIRASE 5355 or 5655 or TEGO FOAMEX 825, 902, or 1488), polyamide particles (such as BYK 1640 or BYK 016), and mixtures thereof.

In one preferred embodiment, the dispersion may, in addition to the water and the PHA also include: (1) from about 0.01 weight percent to about 5.0 weight percent of at least one surfactant; (2) from about 0.01 weight percent to about 5.0 weight percent of at least one rheology modifier; (3) from about 0.01 weight percent to about 2.5 weight percent of at least one wetting and dispersing agent; and (4) from about 0.05 weight percent to about 0.25 weight percent of at least one biocide or biostatic agent.

Preparation of the Dispersion

It is believed that the dispersion of the present disclosure may be prepared using various conventional mixing technologies, such as high or low shear mixers and/or ultrasonic mixers. In a preferred embodiment, the PHA is powderized and then dispersed in water, using a low to high shear mixer in the presence of a surfactant and/or wetting and dispersing agent in order to create initial micelles of the PHA. Then, an ultrasonic mixer/homogenizer is preferably used to finish dispersing the PHA particles to make a homogenous emulsion/dispersion. In some instances, it may be possible to prepare the dispersion using only an ultrasonic mixer/homogenizer or high shear mixer. Once the PHA is homogenously dispersed, any wetting and dispersing agent, biocide or biostatic agent, and/or rheology additive may then be added and shear mixed to complete the dispersion. After final mixing, the viscosity of the dispersion is generally from about 50 to about 2500 centipoise, more preferably from about 50 to about 1000 centipoise, and most preferably from about 100 to about 500 centipoise, when measured at a temperature of about 22° C.

Coated Substrate Food Service Items

Once prepared, the aforementioned dispersion may be applied as a coating to a variety of substrate materials. The dispersion is particularly well suited for use as a coating for substrates formed from paperboard. Products prepared from wood pulp such as paper and paperboards are generally considered to be biodegradable—unless coated with a material which is nonbiodegradable. Application of the biodegradable dispersion of the present disclosure to a substrate, however, provides a coated substrate material which remains biodegradable.

The biodegradable aqueous dispersion may be applied to one or more surfaces of the paperboard or other substrate using conventional coating techniques, such as air knife, flexographic, gravure, rod, and press coating applications. The dispersion is then dried on the substrate to provide the final solid coating layer. The coating weight of the dispersion on the substrate may vary, but in general, the coating is applied over the surface(s) of the substrate at a coating weight, on a dry basis, from about 2 to about 25 grams per square meter, and more preferably from about 4 to about 25 grams per square meter.

The coated substrate may then be converted to provide various end products formed from the coated paperboard or other substrate. According to the present disclosure, the coated substrate may be advantageously converted to provide biodegradable food service items. For instance, the coated substrate may be converted to provide a plate, a cup, a bowl, a fiber tray, or an eating (including drinking) utensil such as a fork, spoon, spork, knife, chopstick, skewer, toothpick, drinking straw, or a beverage stirrer.

In such instances, a paperboard or other biodegradable substrate material includes at least one food contact surface and the dispersion is applied as a coating layer onto this food contact surface. Optionally, other non-food contacting surfaces of the substrate may be coated as well.

The food services items thus provided exhibit excellent resistance to water and grease absorption—generally comparable to paperboard items coated with non-biodegradable polymers such as polyethylene (PE), polypropylene (PP), or polyethylene terephthalate (PET). At the same time, the coated paperboard substrate remains biodegradable.

In particular, resistance to water absorption may be measured using the Cobb water absorption test specified in TAPPI Standard T441. The coated substrates according to the present disclosure typically exhibit a Cobb water absorption value of less than 20 grams per square meter. More preferably, the Cobb water absorption value is less than 10 grams per square meter.

Likewise, resistance to grease absorption may be measured using the Kit grease resistance test specified in TAPPI Standard T559 cm-12. The coated substrates according to the present disclosure typically exhibit a Kit Test grease resistance value of greater than Kit Value 5. More preferably, the Kit Value is from about 8 to about 12.

EXAMPLES

The following non-limiting examples illustrate various additional aspects of the invention. Unless otherwise indicated, temperatures are in degrees Celsius and percentages are by weight based on the dry weight of the formulation.

Example 1-21: Preparation of Aqueous Dispersions

Example 1

In this example, an aqueous dispersion was prepared. 42.0 g of PHA (6.7 mol % hydroxyhexanoate; $M_w$: 357,000 g/mol) was placed in 56 g of water with 1.5 g of Tween 20 and sheared at 1100 RPM for 90 minutes. After shearing, the mixture was subjected to ultrasonic mixing for 3 minutes. 0.05 g of xanthan gum were then added to the resulting white dispersion and further sheared at 400 RPM for 30 minutes. Finally, 0.1% of Biocide was added to the dispersion.

Example 2

A dispersion was prepared as given in Example 1. 0.5 mL of a dispersing agent (DISPERBYK 190) and 0.1 mL of a rheology modifier (BYK 425) was then added to this dispersion and sheared to ensure homogenous mixing.

Example 3

A dispersion was prepared as given in Example 2, and 3.5 g of clay (Imersys Talc) was then added and sheared to a homogenous dispersion.

Example 4

In this example, 42.0 g of PHA (6.7 mol % hydroxyhexanoate; $M_w$: 357,000 g/mol) was placed in 56 g of water with 0.8 g of Tween 20 sheared at 1100 RPM for 90 min. After shearing, the mixture was subjected to ultrasonic mixing for 3 minutes. 0.05 g of xanthan gum were added to the resulting white dispersion and further sheared at 400 RPM for 30 minutes. Finally, 0.1% of Biocide was added to the dispersion.

Example 5

A dispersion was prepared as given in Example 4. 0.75 mL of a dispersing agent (DISPERBYK 190) and 0.1 mL of a rheology modifier (BYK 425) was then added to this dispersion and sheared to ensure homogenous mixing.

Example 6

A dispersion was prepared as given in Example 5, and 10 g of Kaolin clay was then added and sheared to a homogenous dispersion.

Example 7

In this example, 35.0 g of PHA (6.0 mol % hydroxyhexanoate; 545,000 g/mol) was placed in 60 g of water with 2.0 g of Tween 20 and sheared at 1100 RPM for 90 minutes. After shearing, the mixture was subjected to ultrasonic mixing for 7 minutes. 0.05 g of xanthan gum was added to the resulting white dispersion and further sheared at 400 RPM for 30 minutes. Finally, 0.1% of Biocide was added to the dispersion.

Example 8

A dispersion was prepared as given in Example 7, and 7.0 g of Kaolin clay was then added and sheared to a homogenous dispersion.

Example 9

In this example, 30.0 g of PHA (9.3 mol % hydroxyhexanoate; $M_w$: 1,458,000 g/mol) was placed in 65 g of water with 3.0 g of Tween 20 and 2.0 mL Triton 100 and sheared at 900 RPM for 130 minutes. After shearing, the mixture was subjected to ultrasonic mixing for 20 minutes. 0.05 g of xanthan gum was added to the resulting white dispersion and further sheared at 400 RPM for 30 minutes. Finally, 0.1% of Biocide was added to the dispersion.

Example 10

A dispersion was prepared as given in Example 9, and 0.75 mL of a dispersing agent (DISPERBYK 184) was then added and sheared to ensure homogenous mixing.

Example 11

A dispersion was prepared as given in Example 10, and 5.0 g of PHA (28.3 mol % hydroxyhexanoate) was then added and sheared to a homogenous dispersion.

Example 12

In this example, 45.0 g of PHA (6.7 mol % hydroxyhexanoate; $M_w$: 357,000 g/mol) was placed in 56 g of water with 0.8 g of Tween 20 and sheared at 1100 RPM for 60 minutes. After shearing, the mixture was subjected to ultrasonic mixing for 5 minutes. 0.05 g of xanthan gum were then added to the resulting white dispersion and further sheared at 400 RPM for 30 minutes. Finally, 0.1% of Biocide was added to the dispersion.

Example 13

A dispersion was prepared as given in Example 12, and 0.75 mL of a dispersing agent (DISPERBYK 190) and 0.1 mL of a rheology modifier (BYK 425) were then added and sheared to ensure homogenous mixing.

Example 14

In this example, 45.0 g of PHA (6.7 mol % hydroxyhexanoate; $M_w$: 492,000 g/mol) was placed in 53 g of water with 1.5 g of Tego 755 sheared at 10,000 RPM for 5 min. After shearing, the mixture was subjected to ultrasonic mixing for 3 minutes. 0.25 g of Alcogum were added to the resulting white dispersion and further sheared at 7000 RPM for 5 minutes. Finally, 0.1% of Biocide was added to the dispersion.

Example 15

A dispersion was prepared as given in Example 14. 1 mL of a dispersing agent (Tego 761) and 0.1 mL of a rheology modifier (Alcogum) was then added to this dispersion and sheared to ensure homogenous mixing.

Example 16

A dispersion was prepared as given in Example 15, and 10 g of Kaolin clay was then added and sheared to a homogenous dispersion.

Example 17

In this example, 30.0 g of PHA (9.3 mol % hydroxyhexanoate; $M_w$: 1,458,000 g/mol) was placed in 65 g of water with 3.0 g of Tween 20 and 2.0 mL Triton 100 and sheared at 900 RPM for 130 minutes. After shearing, the mixture was subjected to ultrasonic mixing for 20 minutes. 0.05 g of xanthan gum was added to the resulting white dispersion and further sheared at 400 RPM for 30 minutes. Finally, 0.1% of Biocide was added to the dispersion.

Example 18

A dispersion was prepared as given in Example 17, and 0.75 mL of a dispersing agent (Tego 755) was then added and sheared to ensure homogenous mixing.

Example 19

A dispersion was prepared as given in Example 18, and 5.0 g of PHA (28.3 mol % hydroxyhexanoate) was then added and sheared to a homogenous dispersion.

Example 20

In this example, 55.0 g of PHA (6.7 mol % hydroxyhexanoate; $M_w$: 357,000 g/mol) was placed in 53 g of water with 2.5 g Tego 755 and sheared at 10,000 RPM for 10 minutes. After shearing, the mixture was subjected to ultrasonic mixing for 5 minutes. 0.1 g of xanthan gum and 0.25 g of Alcogum were then added to the resulting white dispersion and further sheared at 4000 RPM for 3 minutes. Finally, 0.1% of Biocide was added to the dispersion.

Example 21

A dispersion was prepared as given in Example 20, and 0.75 mL of a dispersing agent (Tego 761) and 1.0 mL of a rheology modifier starch were then added and sheared to ensure homogenous mixing.

Examples 22-24: Preparation and Testing of Coated Substrates

Example 22

The aqueous dispersion from Examples 1, 4, and 12 were each coated using a Mayer rod 4 on both 14 pt and 18 pt thickness solid bleached sulphate (SBS) paperboard substrates. The coatings were cured at 170° C. in a forced air oven and were applied to 8 grams per square meter (gsm) dry coat weight. The resulting Cobb water absorption values for each of these dispersions were less than 30 gsm, with Kit grease resistance values greater than 5.

Example 23

The aqueous dispersion from Examples 2, 5, and 13 were each coated using a Mayer rod 4 on both 14 and 18 pt thickness solid bleached sulphate (SBS) paperboard substrates. The coatings were cured at 170° C. in a forced air oven and were applied to 8 gsm dry coat weight. The resulting Cobb water absorption values for each of these dispersions were less than 10 gsm with Kit grease resistance values greater than 9.

Example 24

The aqueous dispersion from Examples 3, 6, 14, 15, 16, 20 and 21 were each coated using a Mayer rod 4, 6, 8, 9 on 14 and 18 pt thickness solid bleached sulphate (SBS) paperboard substrates. The coatings were cured at 170° C. in a forced air oven and were applied to 8 gsm dry coat weight. The resulting Cobb water absorption values for each of these dispersions were less than 10 gsm with Kit grease resistance values greater than 9.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A biodegradable aqueous dispersion for coating food contact substrates, the dispersion comprising:
   from about 35 to about 75 weight percent water;
   from about 25 to about 65 weight percent of polyhydroxyalkanoates having a weight average molecular weight from about 50,000 Daltons to about 2.5 million Daltons;
   from about 0.1 weight percent to about 5 weight percent of at least one nucleating agent;
   from about 0.01 weight percent to about 5.0 weight percent of at least one surfactant;
   from about 0.01 weight percent to about 5.0 weight percent of at least one rheology modifier;
   from about 0.01 weight percent to about 2.5 weight percent of at least one wetting and dispersing agent; and
   from about 0.01 weight percent to about 0.5 weight percent of at least one biocide or biostatic agent,
   wherein the dispersion has an average solids content from about 25 percent to about 65 percent solids and
   wherein the dispersion is prepared by
      mixing water, the polyhydroxyalkanoates, the at least one surfactant, and the at least one wetting and dispersing agent to form a mixture comprising initial micelles of the polyhydroxyalkanoates,
      homogenizing the mixture to form a dispersion, and
      further adding the at least one nucleating agent, the at least one rheology modifier, and the at least one biocide or biostatic agent to the dispersion.

2. The biodegradable aqueous dispersion of claim 1, wherein the dispersion comprises from about 25 to about 65 weight percent poly-3-hydroxybutyrate-co-3-hydroxyhexanoate ("P(3HB-co-3HHx)").

3. The biodegradable aqueous dispersion of claim 2, wherein the P(3HB-co-3HHx) comprises from about 75 to about 99 mole percent hydroxybutyrate and from about 1 to about 25 mole percent hydroxyhexanoate.

4. The biodegradable aqueous dispersion of claim 1, wherein the dispersion further comprises from about 1 to about 25 weight percent of at least one polyhydroxyalkanoate comprising from about 25 to about 50 mole percent of hydroxyvalerate, hydroxyhexanoate, hydroxyoctanoate, or hydroxydecanoate.

5. The biodegradable aqueous dispersion of claim 1, wherein the dispersion further comprises from about 0.01 weight percent to about 5.0 weight percent of at least one surfactant selected from the group consisting of polysorbates, aromatic polyethylene oxides, sorbitan derivatives, block copolymers of poly(ethylene oxide) and poly(propylene oxide), poly(glycol ethers), poly(vinyl alcohol), alkyl sulfates, alkyl phosphates, stearates, and mixtures thereof.

6. The biodegradable aqueous dispersion of claim 5, wherein the at least one surfactant has a hydrophilic-lipophilic balance which is greater than 10.

7. The biodegradable aqueous dispersion of claim 1, wherein the dispersion further comprises from about 0.01 weight percent to about 5.0 weight percent of at least one rheology modifier selected from the group consisting of polysaccharides, acrylate-based emulsion copolymers, viscosity depressants, and viscosity enhancers.

8. The biodegradable aqueous dispersion of claim 1, wherein the dispersion further comprises from about 0.1 weight percent to about 5.0 weight percent of at least one coalescing agent selected from the group consisting of bio-succinic acid based coalescing solvent, 2,2,4-trimethyl-1,3-pentanediol monoisobutyrate, dimethyl carbonate, methanol, ethanol, ketones, acetates, and or mixtures thereof.

9. The biodegradable aqueous dispersion of claim 1, wherein the dispersion further comprises from about 1 weight percent to about 35 weight percent of at least one filler selected from the group consisting of clays, calcium carbonate, talc, kaolinite, montmorillonite, bentonite, silica, chitin, titanium dioxide, nano clay, or mixtures thereof.

10. The biodegradable aqueous dispersion of claim 1, wherein the dispersion further comprises from about 0.5 weight percent to about 15 weight percent of at least one plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene) glycols having a number average molecular weight of 400-10,000 g/mol, esters of vegetable oils, long chain alkyl acids, adipates, glycerol, isosorbide derivatives or mixtures thereof.

11. The biodegradable aqueous dispersion of claim 1, wherein the dispersion further comprises from about 0.1 weight percent to about 5 weight percent of at least one nucleating agent selected from the group consisting of sulfur, erythritols, pentaerythritol, dipentaerythritols, artificial sweetners, stearates, sorbitols, polyester waxes, 2:1; 2:1 crystal structure chemicals and mixtures thereof.

12. The biodegradable aqueous dispersion of claim 1, wherein the dispersion further comprises from about 0.01 weight percent to about 5 weight percent of at least one crosslinking agent selected from the group consisting of calendula oil, stabilized ammonium zirconium carbonate, anionic hydroxylated zirconium polymers, potassium zirconium carbonate, anionic hydroxylated zirconium polymers, zinc tetraamine carbonate, and mixtures thereof.

13. The biodegradable aqueous dispersion of claim 1, wherein the dispersion further comprises from about 0.05 to about 1 weight percent of at least one defoamer selected from the group consisting of polyether siloxanes, polyamide particles, and mixtures thereof.

14. The biodegradable aqueous dispersion of claim 1, wherein the dispersion further comprises:
- from about 0.01 weight percent to about 5.0 weight percent of at least one surfactant;
- from about 0.01 weight percent to about 5.0 weight percent of at least one rheology modifier;
- from about 0.01 weight percent to about 2.5 weight percent of at least one wetting and dispersing agent; and
- from about 0.01 weight percent to about 0.5 weight percent of at least one biocide.

15. A biodegradable food service item comprising: a biodegradable substrate having at least one food contact surface; and a coating applied over the at least one food contact surface, wherein the coating is applied as the biodegradable aqueous dispersion of claim 1.

16. The biodegradable food service item of claim 15, wherein the biodegradable substrate comprises a biodegradable plate, cup, bowl, fiber tray, or eating utensil.

17. The biodegradable food service item of claim 15, wherein the coating is applied over the at least one food contact surface at a coating weight, on a dry basis, from about 4 to about 25 grams per square meter.

18. The biodegradable food service item of claim 15, wherein the coating exhibits a Cobb water absorption value, measured according to TAPPI Standard T441, of less than 20 grams per square meter.

19. The biodegradable food service item of claim 15, wherein the coating exhibits Kit Test grease resistance value, measured according to TAPPI Standard T559 cm-12, of greater than Kit Value 5.

\* \* \* \* \*